US012150020B2

(12) United States Patent
Lee et al.

(10) Patent No.: US 12,150,020 B2
(45) Date of Patent: Nov. 19, 2024

(54) METHOD AND APPARATUS FOR ACQUIRING INFORMATION OF CHIP DEVICE USING GAS IN WIRELESS LAN SYSTEM IN SMART HOME ENVIRONMENT

(71) Applicant: LG Electronics Inc., Seoul (KR)

(72) Inventors: Byungjoo Lee, Seoul (KR); Jeonghwan Kim, Seoul (KR); Youngjun Jo, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 337 days.

(21) Appl. No.: 17/534,778

(22) Filed: Nov. 24, 2021

(65) Prior Publication Data

US 2022/0279323 A1 Sep. 1, 2022

(51) Int. Cl.
*H04W 4/23* (2018.01)
*G06K 19/06* (2006.01)
(Continued)

(52) U.S. Cl.
CPC ........ *H04W 4/23* (2018.02); *G06K 19/06037* (2013.01); *H04L 12/2803* (2013.01);
(Continued)

(58) Field of Classification Search
CPC ........... H04W 4/23; H04W 4/70; H04W 4/80; H04W 12/03; H04W 12/0431;
(Continued)

(56) References Cited

U.S. PATENT DOCUMENTS

2017/0289900 A1* 10/2017 Tchigevsky ........... H04W 48/16
2021/0219353 A1* 7/2021 Montemurro ......... H04W 76/10
2021/0298101 A1* 9/2021 Mizuno .................... H04W 4/80

FOREIGN PATENT DOCUMENTS

TW            200910881 A  * 3/2009   ......... H04L 12/2856
WO    WO-2013048645 A1 * 4/2013   ........... G06F 15/177
(Continued)

OTHER PUBLICATIONS

Machine-translated version of TW-200910881-A, published Mar. 1, 2009 retrieved from PE2E Search on Jan. 9, 2024 (Year: 2009).*
(Continued)

*Primary Examiner* — Omar J Ghowrwal
*Assistant Examiner* — Adam Joel Cerlanek
(74) *Attorney, Agent, or Firm* — BRYAN CAVE LEIGHTON PAISNER LLP

(57) ABSTRACT

Provided are a method and apparatus for acquiring information of a CHIP device using a GAS in a wireless LAN system in a smart home environment Specifically, a controller obtains first to third identifiers by scanning a quick response (QR) code of a controlee; The controller transmits a GAS initiation request message to the controlee. The controller receives a GAS initiation response message from the controlee. The GAS initiation request message includes first and second identifiers and an encrypted payload. The GAS initiation response message includes a decrypted payload when the first and second identifiers are the same as identifiers of the controlee.

16 Claims, 16 Drawing Sheets

(51) Int. Cl.
  *H04L 12/28* (2006.01)
  *H04W 4/80* (2018.01)
  *H04W 12/03* (2021.01)
  *H04W 12/0431* (2021.01)
  *H04W 12/06* (2021.01)
  *H04W 84/12* (2009.01)

(52) U.S. Cl.
  CPC ............ *H04W 4/80* (2018.02); *H04W 12/03* (2021.01); *H04W 12/0431* (2021.01); *H04W 12/068* (2021.01); *H04L 2012/2841* (2013.01); *H04W 84/12* (2013.01)

(58) Field of Classification Search
  CPC ............... H04W 12/068; H04W 84/12; G06K 19/06037; H04L 12/2803; H04L 2012/2841
  See application file for complete search history.

(56) References Cited

FOREIGN PATENT DOCUMENTS

| WO | WO-2016065892 | A1 | * | 5/2016 | ............ H04W 12/00 |
| WO | WO-2022261837 | A1 | * | 12/2022 | |
| WO | WO-2023272460 | A1 | * | 1/2023 | |

OTHER PUBLICATIONS

Machine-translated version of WO-2016065892-A1, published May 6, 2016 retrieved from PE2E Search on Jan. 17, 2024 (Year: 2016).*
Machine-translated version of WO-2023272460-A1, published 2023 retrieved from PE2E Search on Jan. 16, 2024 (Year: 2023).*
Machine-translated version of WO-2022261837-A1, published 2022 retrieved from PE2E Search on Jan. 17, 2024 (Year: 2022).*
Definition of 'encryption' from Oxford Languages, Google search [retrieved on Jan. 16, 2024]. Retrieved from the Internet <URL: https://www.google.com/search?q=define+encryption&rlz=1C1GCEA_enUS1077US1077&oq=define+encry&gs_lcrp=EgZjaH>.*
Project CHIP/Matter Project Overview [online]. Matter Working Group, Connectivity Standards Alliance, 2021 [retrieved on Jun. 27, 2024]. Retrieved from the Internet: <URL: https://web.archive.org/web/20211102210543/https://github.com/project-chip/connectedhomeip> (Year: 2021).*
IEEE Std 802.11u [online]. IEEE Standards Association, IEEE Computer Society, 2011 [retrieved on Jun. 28, 2024]. Retrieved from the Internet: <URL: https://ieeexplore.ieee.org/stamp/stamp.jsp?arnumber=5721908>. (Year: 2011).*

* cited by examiner

FIG. 1
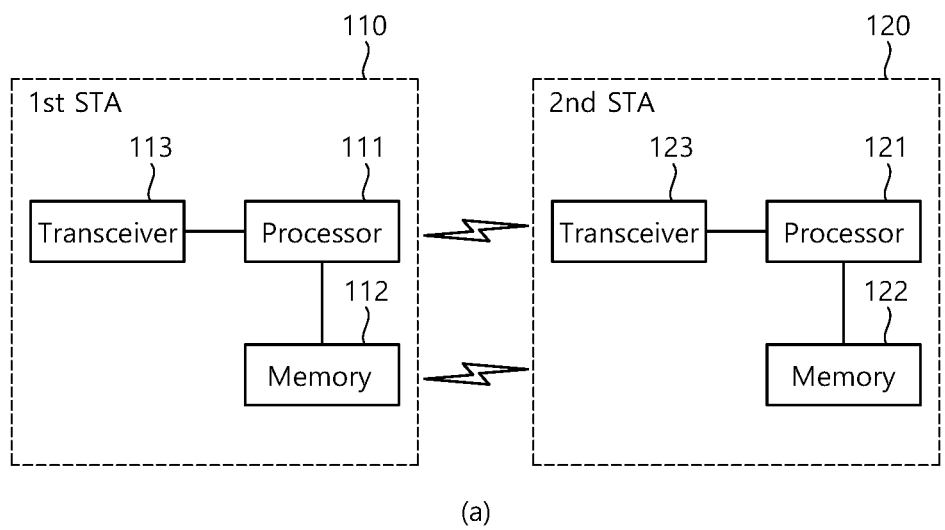
(a)
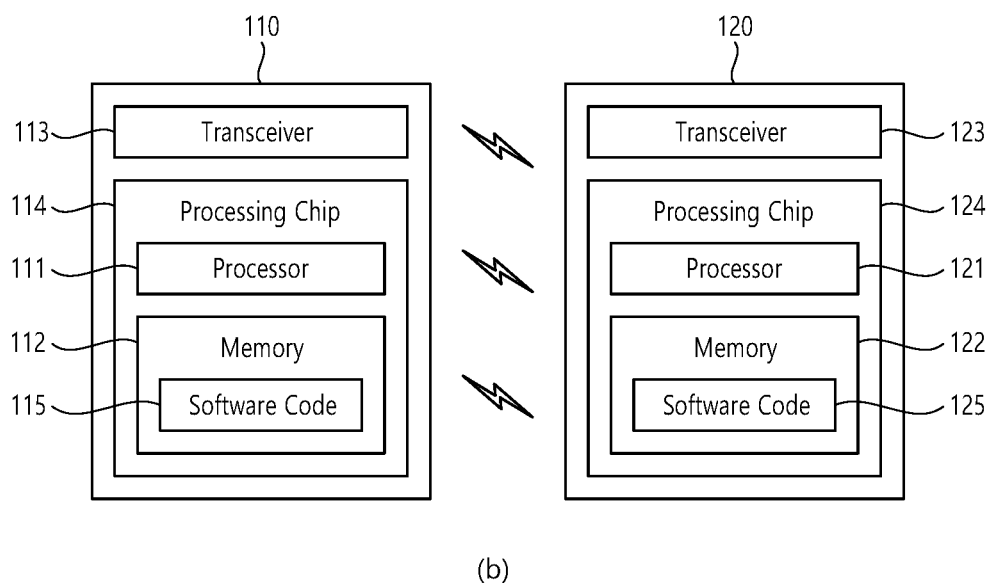
(b)

FIG. 2
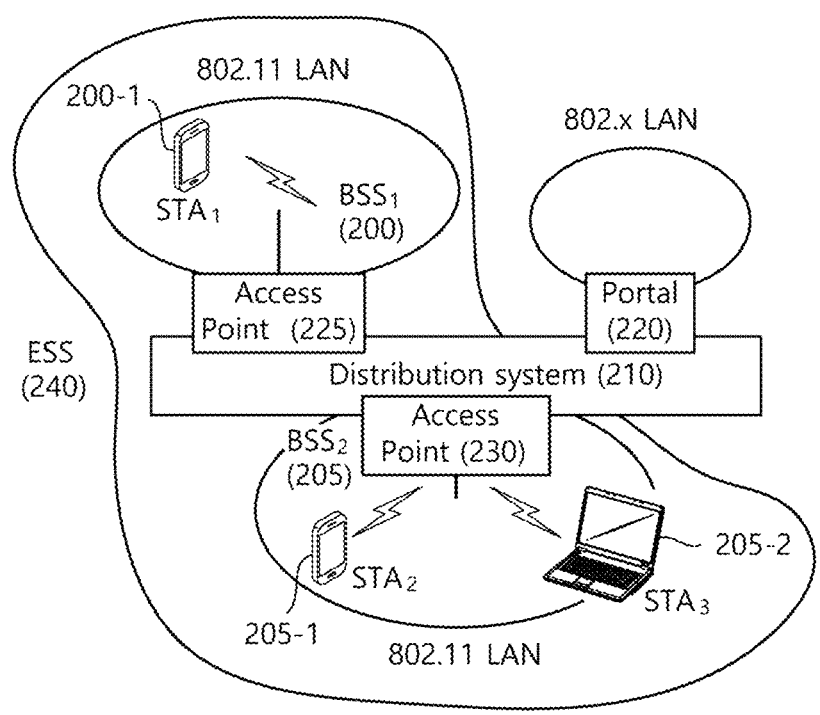
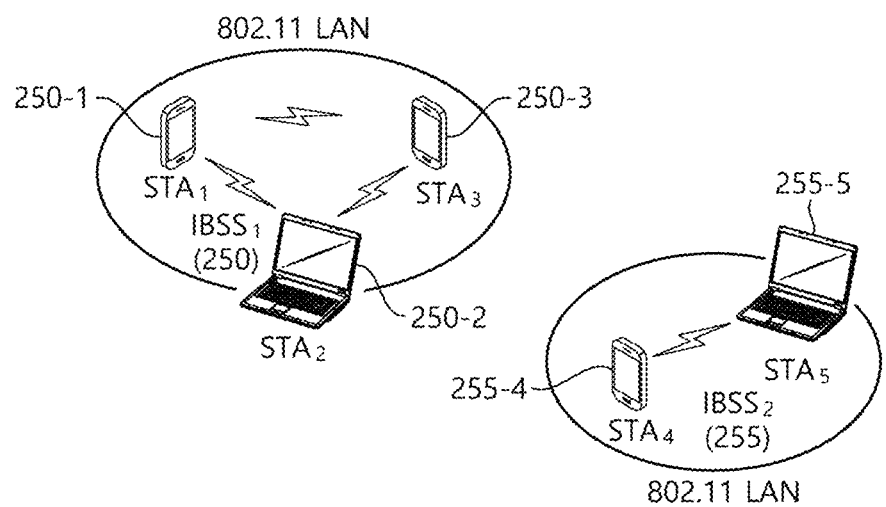

FIG. 11

```
- ANQP Request
   - Length: xx
   - Info ID: ANQP Vendor specific list
      - Length: xx
      - OUI: xx:xx:xx (Zigbee Alliance)
      - Service Update Indicator: 0
      - Service TLV (ID: x, Type: CHIP Rendezvous)
         - Length: xx
         - Servcie Protocol: CHIP Rendezvous or Bonjour
         - Service Transaction ID: 1
         - Vendor ID: xxxxx
         - Product ID: xxxxx
         - Query Data
            - {Any Query Data which is defined by SHIP standard}
```

FIG. 12

```
- ANQP Request
    - Length: xx
    - Info ID: ANQP Vendor specific list
        - Length: xx
        - OUI: xx:xx:xx (Zigbee Alliance)
        - (Optional subtype)
        - Service Update Indicator: 0
        - Service TLV (ID: x, Type: CHIP)
            - Length: xx
            - Servcie Protocol: CHIP Rendezvous/Bonjour
            - Service Transaction ID: 1
            - Status Code: Success (0)
            - Response Data
                - {Any Response data which is defined by CHIP standard}
```

METHOD AND APPARATUS FOR ACQUIRING INFORMATION OF CHIP DEVICE USING GAS IN WIRELESS LAN SYSTEM IN SMART HOME ENVIRONMENT

CROSS-REFERENCE TO RELATED APPLICATIONS

Pursuant to 35 U.S.C. § 119(a), this application claims the benefit of Korean Patent Applications No. 10-2020-0127516 filed on Sep. 29, 2020, the contents of which are all hereby incorporated by reference herein in their entirety

BACKGROUND OF THE DISCLOSURE

Field of the Disclosure

The present disclosure relates to a method of setting an IoT device in a wireless LAN system in a smart home environment, and more particularly, to a method and apparatus for acquiring information of a CHIP device using a GAS.

Related Art

In recent years, the Zigbee Alliance announced a new working group to drive the development and adoption of a new, royalty-free connectivity standard that increases compatibility between smart home products and embeds security into fundamental design principles.

The goal of the Connected Home over IP project is to simplify development for manufacturers and increase compatibility for consumers. The project is based on the common belief that smart home devices need to ensure security, stability, and smooth usability. The project seeks to enable communication between smart home devices, mobile apps, and cloud services based on the Internet Protocol (IP), and to define a set of specific IP-based networking technologies for device authentication.

The industry working group adopts an open source approach to the development and application of new unified connectivity protocols. The project will utilize market-proven smart home technologies from companies and Zigbee Alliance. The decision to utilize these technologies is expected to accelerate the protocol development process and provide rapid benefits to manufacturers and consumers.

The project aims to simplify manufacturing of smart homes for device manufacturers, as well as devices compatible with voice recognition services. The upcoming protocol will complement existing technology, and the working group members encourage device manufacturers to continue to innovate based on existing technology.

The connected home over IP project encourages device manufacturers, silicon providers, and developers in the smart home industry to participate and contribute to development standards.

SUMMARY

The present disclosure provides a method and apparatus for acquiring information of a CHIP device using GAS in a wireless LAN system in a smart home environment.

An example of the present disclosure provides a method of acquiring information of a CHIP device using a GAS.

This embodiment provides a method in which an IoT device acquires information on a CHIP device using GAS and encrypts or decrypts the information before connecting or being associated with a CHIP device (controlee) to an AP in a smart home environment. A controller to be described below may correspond to a smart phone as the IoT controller, a controlee to be described later may correspond to a smart light bulb, a smart sensor, etc., as the IoT device, and an AP to be described later may correspond to a home AP to which the smartphone is connected.

The controller obtains first to third identifiers by scanning a quick response (QR) code of the controlee.

The controller transmits a generic advertisement service (GAS) initiation request message to the controlee.

The controller receives a GAS initiation response message from the controlee.

The GAS initiation request message includes the first and second identifiers and the encrypted payload. The GAS initiation response message includes a decrypted payload when the first and second identifiers are the same as identifiers of the controlee. The GAS initiation response message may include a request failure message when the first and second identifiers are not the same as the identifiers of the controlee.

According to the embodiment proposed in the present disclosure, a controller is associated with a soft AP in which a controlee operates to acquire information on a controlee using GAS, and transmits the information on the AP to the controlee before the controlee is associated with the AP, thereby more efficiently performing IP communication. In addition, by encrypting and decrypting the payload included in the GAS message, it is possible to strengthen the security of the corresponding information and protect the privacy.

BRIEF DESCRIPTION OF THE DRAWINGS

FIG. 1 illustrates an example of a transmitting apparatus and/or a receiving apparatus of the present disclosure.

FIG. 2 is a conceptual diagram illustrating a structure of a wireless local area network (WLAN).

FIG. 11 is a diagram illustrating a form of an ANQP query.

FIG. 12 is a diagram illustrating a form of the ANQP response format.

DESCRIPTION OF EXEMPLARY EMBODIMENTS

Figure 3:
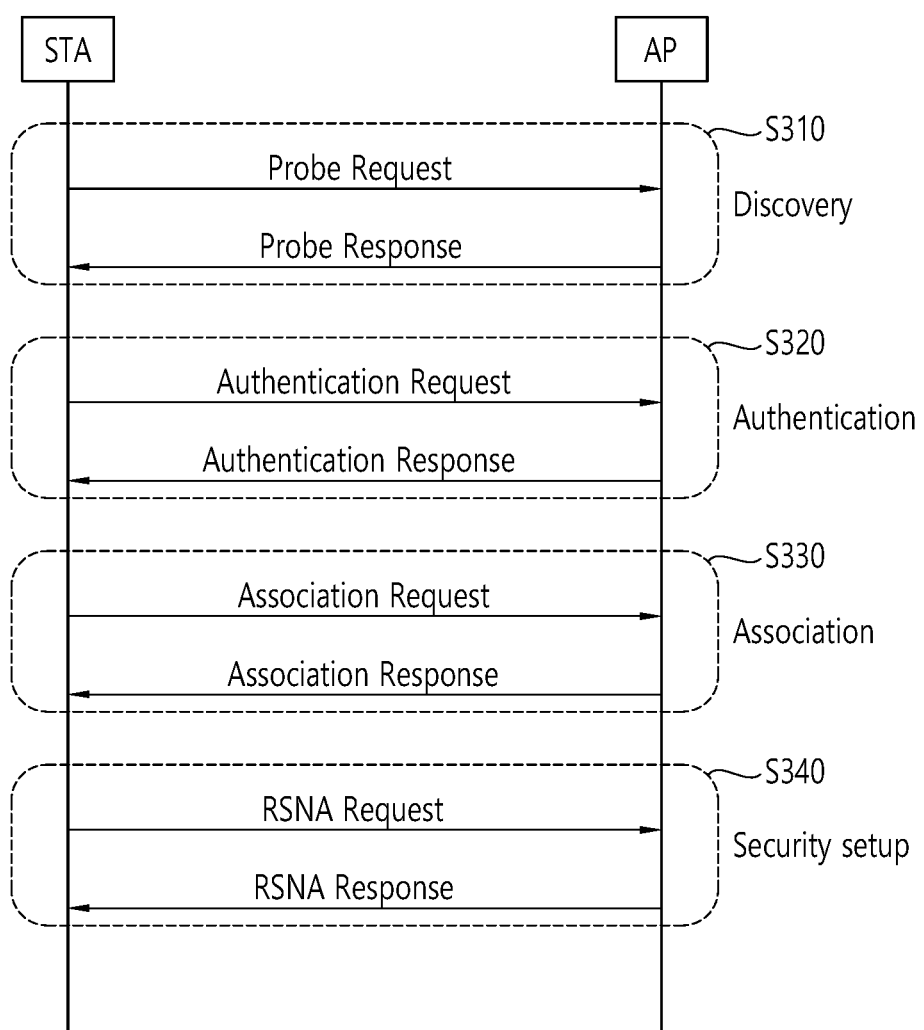
FIG. 3 is a diagram for describing a general link setup process.

In the present disclosure, "A or B" may mean "only A", "only B" or "both A and B". In other words, "A or B" in the present disclosure may be interpreted as "A and/or B". For example, in the present disclosure, "A, B, or C" means "only A", "only B", "only C", or "any and any combination of A, B, and C".

A slash (/) or comma (comma) used in the present disclosure may mean "and/or". For example, "A/B" may mean "and/or B". Accordingly, "A/B" may mean "only A", "only B", or "both A and B". For example, "A, B, C" may mean "A, B, or C".

In the present disclosure, "at least one of A and B" may mean "only A" "only B" or "both A and B". Also, in the present disclosure, the expression "at least one of A or B" or "at least one of A and/or B" means may be interpreted equivalently to the expression "at least one of A and B".

Also, in the present disclosure, "at least one of A, B, and C" means "only A", "only B", "only C", or "any combination of A, B and C". Also, "at least one of A, B, or C" or "at least one of A, B and/or C" means may mean "at least one of A, B, and C".

Also, parentheses used in the present disclosure may mean "for example". Specifically, when displayed as "control information (EHT-Signal)", "EHT-Signal" may be provided as an example of "control information". In other words, the "control information" of the present disclosure is not limited to the "EHT-Signal", and the "EHT-Signal" may be provided as an example of "control information". Also, even when displayed as "control information (i.e., EHT-signal)", "EHT-Signal" may be provided as an example of "control information".

Technical features that are individually described within one drawing in the present disclosure may be implemented individually or may be implemented at the same time.

The following example of the present disclosure may be applied to various wireless communication systems. For example, the following example of the present disclosure may be applied to a wireless local area network (WLAN) system. For example, the present disclosure may be applied to IEEE 802.11a/g/n/ac standards or IEEE 802.11ax standards. In addition, the present disclosure may be applied to a newly provided EHT standard or IEEE 802.11be standard. In addition, an example of the present disclosure may be applied to the EHT standard or a new wireless LAN standard that enhances IEEE 802.11be. In addition, an example of the present disclosure may be applied to a mobile communication system. For example, it may be applied to a mobile communication system based on Long Term Evolution (LTE) based on the 3rd Generation Partnership Project (3GPP) standard and its evolution. In addition, an example of the present disclosure may be applied to a communication system of the 5G NR standard based on the 3GPP standard.

Hereinafter, in order to explain the technical characteristics of the present disclosure, the technical features to which the present disclosure may be applied will be described.

FIG. 1 illustrates an example of a transmitting apparatus and/or a receiving apparatus of the present disclosure.

The example of FIG. 1 may perform various technical features described below. FIG. 1 relates to at least one station (STA). For example, STAs 110 and 120 of the present disclosure may be called various names such as a mobile terminal, a wireless device, a wireless transmit/receive unit (WTRU), a user equipment (UE), a mobile station (MS), a mobile subscriber unit, or a simple user. The STAs 110 and 120 of the present disclosure may be called various names such as a network, a base station, a Node-B, an access point (AP), a repeater, a router, and a relay. The STAs 110 and 120 of the present disclosure may be called various names, such as a receiving apparatus, a transmitting apparatus, a receiving STA, a transmitting STA, a receiving device, and a transmitting device.

For example, the STAs 110 and 120 may perform an access point (AP) role or a non-AP role. That is, the STAs 110 and 120 of the present disclosure may perform functions of the AP and/or non-AP. In the present disclosure, the AP may also be indicated as an AP STA.

The STAs 110 and 120 of the present disclosure may support various communication standards other than the IEEE 802.11 standard. For example, communication standards (e.g., LTE, LTE-A, 5G NR standard) or the like according to the 3GPP standard may be supported. In addition, the STA of the present disclosure may be implemented in various devices such as a mobile phone, a vehicle, and a personal computer. In addition, the STA of the present disclosure may support communication for various communication services such as voice call, video call, data communication, and autonomous driving (self-driving, autonomous-driving).

In the present disclosure, the STAs 110 and 120 may include a medium access control (MAC) conforming to the IEEE 802.11 standard and a physical layer interface for a wireless medium.

The STAs 110 and 120 will be described based on sub-view, FIG. 1A as follows.

The first STA 110 may include a processor 111, a memory 112, and a transceiver 113. The illustrated processor, memory, and transceiver may each be implemented as separate chips, or at least two or more blocks/functions may be implemented through one chip.

The transceiver 113 of the first STA performs a signal transmission/reception operation. Specifically, IEEE 802.11 packets (e.g., IEEE 802.11a/b/g/n/ac/ax/be, etc.) may be transmitted/received.

For example, the first STA 110 may perform an intended operation of the AP. For example, the processor 111 of the AP may receive a signal through the transceiver 113, process the received signal, generate a transmission signal, and perform control for signal transmission. The memory 112 of the AP may store a signal (i.e., a received signal) received through the transceiver 113, and may store a signal (i.e., a transmission signal) to be transmitted through the transceiver.

For example, the second STA 120 may perform an intended operation of the non-AP STA. For example, the transceiver 123 of the non-AP performs a signal transmission/reception operation. Specifically, IEEE 802.11 packets (e.g., IEEE 802.11a/b/g/n/ac/ax/be, etc.) may be transmitted/received.

For example, the processor 121 of the non-AP STA may receive a signal through the transceiver 123, process the received signal, generate a transmission signal, and perform control for signal transmission. The memory 122 of the non-AP STA may store a signal (i.e., a received signal) received through the transceiver 123, and may store a signal to be transmitted through the transceiver (i.e., a transmission signal).

For example, an operation of a device denoted as an AP in the following specification may be performed by a first STA 110 or a second STA 120. For example, when the first STA 110 is the AP, the operation of the device indicated by the AP may be controlled by the processor 111 of the first STA 110, and the related signal may be may be transmitted or received through the transceiver 113 controlled by the processor 111 of the first STA 110. In addition, the control information related to the operation of the AP or the transmission/reception signal of the AP may be stored in the memory 112 of the first STA 110. In addition, when the second STA 110 is the AP, the operation of the device indicated by the AP is controlled by the processor 121 of the second STA 120 and controlled by the processor 121 of the second STA 120. In addition, the control information related to the operation of the AP or the transmission/reception signal of the AP may be stored in the memory 122 of the second STA 120.

For example, an operation of a device indicated as the non-AP (or user-STA) in the following specification may be performed by the first STA 110 or the second STA 120. For example, when the second STA 120 is the non-AP, the operation of the device indicated as the non-AP may be controlled by the processor 121 of the second STA 120, and the related signal may be transmitted or received via the transceiver 123 controlled by the processor 121 of the second STA 120. In addition, control information related to the operation of the non-AP or the AP transmission/reception signal may be stored in the memory 122 of the second STA 120. For example, when the first STA 110 is the non-AP, the operation of the device indicated as the non-AP may be controlled by the processor 110 of the first STA 110, and the related signal may be transmitted or received via the transceiver 113 controlled by the processor 111 of the first STA 110. In addition, control information related to the operation of the non-AP or the AP transmission/reception signal may be stored in the memory 112 of the first STA 110.

In the following specification (transmitting/receiving) STA, the first STA, the second STA, STA1, STA2, AP, a first AP, a second AP, AP1, AP2, a (transmitting/receiving) terminal, a (transmitting/receiving) device, a (transmission/reception) apparatus, a device called a network, etc. may refer to the STAs 110 and 120 of FIG. 1. For example, without (transmitting/receiving) STA without specific reference numerals, the first STA, the second STA, the STA1, the STA2, the AP, the first AP, the second AP, the AP1, the AP2, the (transmitting/receiving) terminal, the (transmitting/receiving) device, the (transmitting/receiving) apparatus, and the device indicated by the network may also refer to the STAs 110 and 120 of FIG. 1. For example, in the following example, an operation in which various STAs transmit and receive signals (e.g., PPPDUs) may be performed by the transceivers 113 and 123 of FIG. 1. In addition, in the following example, the operations of various STAs generating transmission/reception signals or performing data processing or calculation in advance for the transmission/reception signals may be performed by the processors 111 and 121 of FIG. 1. For example, an example of an operation of generating a transmission/reception signal or performing data processing or operation in advance for a transmission/reception signal may include 1) an operation of determining/acquiring/configuring/calculating/decoding/encoding bit information of a subfield (SIG, STF, LTF, Data) field included in the PPDU; 2) an operation of determining/configuring/obtaining a time resource or a frequency resource (e.g., a subcarrier resource) used for a subfield (SIG, STF, LTF, Data) field included in the PPDU; 3) Determine/configure/a specific sequence (e.g., pilot sequence, STF/LTF sequence, extra sequence applied to SIG) used for the subfield (SIG, STF, LTF, Data) field included in the PPDU, etc. recovery action, 4) a power control operation and/or a power saving operation applied to the STA; 5) operations related to determination/acquisition/configuration/operation/decoding/encoding of ACK signal. In addition, in the following example, various information (e.g., field/subfield/control field/parameter/power related information) used by various STAs for determination/acquisition/configuration/computation/decoding/encoding of transmission/reception signals is may be stored in the memories 112 and 122 of FIG. 1.

Regarding the device/STA of sub-view, FIG. 1A described above may be modified as illustrated in sub-view, FIG. 1B. Hereinafter, the STAs 110 and 120 of the present disclosure will be described based on sub-view, FIG. 1B.

For example, the transceivers 113 and 123 illustrated in FIG. 1B may perform the same function as the transceivers illustrated in FIG. 1A. For example, the processing chips 114 and 124 illustrated in FIG. 1B may include processors 111 and 121 and memories 112 and 122. The processors 111 and 121 and the memories 112 and 122 illustrated in FIG. 1B are the processors 111 and 121 and the memories 112 and 122 illustrated in FIG. 1A may perform the same function.

As described below, a mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, router, a relay, a receiving apparatus, a transmitting apparatus, a receiving STA, a transmitting STA, a receiving device, a transmitting device, a receiving apparatus, and/or a transmitting apparatus means the STAs 110 and 120 illustrated in the sub-views, FIGS. 1A and 1B, or may mean the processing chips 114 and 124 illustrated in FIG. 1B. That is, the technical features of the present disclosure may be performed on the STAs 110 and 120 illustrated in the sub-views, FIGS. 1A and 1B, and only in the processing chip 114 and 124 illustrated in the sub-view, FIG. 1B. For example, a technical feature in which a transmitting STA transmits a control signal is that the control signals generated by the processors 111 and 121 illustrated in the sub-views, FIGS. 1A and 1B may be understood as a technical feature transmitted through the transceivers 113 and 123 illustrated in the sub-views, FIGS. 1A and 1B. Alternatively, the technical feature in which the transmitting STA transmits the control signal may be understood as a technical feature in which the control signal to be transmitted to the transceivers 113 and 123 is generated from the processing chips 114 and 124 illustrated in the sub-view, FIG. 1B.

For example, the technical feature in which the receiving STA receives the control signal may be understood as the technical feature in which the control signal is received by the transceivers 113 and 123 illustrated in the sub-view, FIG. 1A. Alternatively, the technical feature in which the receiving STA receives the control signal may be understood as the technical feature that the control signal received by the transceivers 113 and 123 illustrated in the sub-view, FIG. 1A is acquired by the processors 111 and 121 illustrated in the sub-view, FIG. 1A. Alternatively, the technical feature in which the receiving STA receives the control signal may be understood as the technical feature that the control signals received by the transceivers 113 and 123 illustrated in the sub-view, FIG. 1B are acquired by the processing chips 114 and 124 illustrated in the sub-view, FIG. 1B.

Referring to the sub-view, FIG. 1B, software codes 115 and 125 may be included in the memories 112 and 122. The software codes 115 and 125 may include instructions for controlling the operations of the processors 111 and 121. The software codes 115 and 125 may be included in a variety of programming languages.

The processors 111 and 121 or the processing chips 114 and 124 illustrated in FIG. 1 may include an application-specific integrated circuit (ASIC), other chipsets, logic circuits, and/or data processing devices. The processor may be an application processor (AP). For example, the processors 111 and 121 or the processing chips 114 and 124 illustrated in FIG. 1 may include at least one of a digital signal processor (DSP), a central processing unit (CPU), a graphics processing unit (GPU), and a modem (modulator and demodulator). For example, the processors 111 and 121 or the processing chips 114 and 124 illustrated in FIG. 1 are a SNAPDRAGON™ series processor manufactured by Qualcomm®, EXYNOS™ series processor manufactured by Samsung®, A series processor manufactured by Apple®, HELIO™ series processor manufactured by MediaTek®, an ATOM™ series processor manufactured by INTEL®, or a processor enhancing them.

In the present disclosure, an uplink may mean a link for communication from a non-AP STA to an AP STA, and an uplink PPDU/packet/signal may be transmitted through the uplink. In addition, in the present disclosure, the downlink may mean a link for communication from the AP STA to the non-AP STA, and a downlink PPDU/packet/signal or the like may be transmitted through the downlink.

FIG. 2 is a conceptual diagram illustrating a structure of a wireless local area network (WLAN).

An upper part of FIG. 2 illustrates a structure of an infrastructure basic service set (BSS) of the Institute of Electrical and Electronic Engineers (IEEE) 802.11.

Referring to the upper part of FIG. 2, a wireless LAN system may include one or more infrastructure BSSs 200 and 205 (hereinafter, BSSs). The BSSs 200 and 205 are a set of APs and STAs, such as an access point (AP) 225 and a station 200-1 (STA1) that may communicate with each other through successful synchronization, and are not a concept indicating a specific area. The BSS 205 may include one or more STAs 205-1 and 205-2 connectable to one AP 230.

The BSS may include at least one STA, APs 225 and 230 that provide a distribution service, and a distribution system DS 210 that connects a plurality of APs.

The distributed system 210 may implement an extended service set (ESS) 240 that is an extended service set by connecting several BSSs 200 and 205. The ESS 240 may be used as a term indicating one network in which one or several APs are connected through the distributed system 210. The APs included in one ESS 240 may have the same service set identification (SSID).

The portal 220 may serve as a bridge connecting a wireless LAN network (IEEE 802.11) and another network (e.g., 802.X).

In the BSS as illustrated in the upper part of FIG. 2, a network between the APs 225 and 230 and a network between the APs 225 and 230 and the STAs 200-1, 205-1 and 205-2 may be implemented. However, it may also be possible to establish a network and perform communication between STAs without the APs 225 and 230. A network that establishes a network and performs communication even between STAs without the APs 225 and 230 is defined as an ad-hoc network or an independent basic service set (IBSS).

The lower part of FIG. 2 is a conceptual diagram illustrating the IBSS.

Referring to the lower part of FIG. 2, the IBSS is a BSS operating in an ad-hoc mode. Since the IBSS does not include an AP, there is no centralized management entity that performs a centralized management function. That is, in the IBSS, the STAs 250-1, 250-2, 250-3, 255-4, and 255-5 are managed in a distributed manner. In IBSS, all STAs 250-1, 250-2, 250-3, 255-4, and 255-5 may be mobile STAs, and cannot access a distributed system, and therefore, forms a self-contained network.

FIG. 3 is a diagram for describing a general link setup process.

In the illustrated step S310, the STA may perform a network discovery operation. The network discovery operation may include a scanning operation of the STA. That is, in order for the STA to access the network, there is a need to find a network that may participate in the wireless network. The STA needs to identify a compatible network before participating in the wireless network. The process of identifying a network existing in a specific area is called scanning. The scanning method includes active scanning and passive scanning.

FIG. 3 exemplarily illustrates a network discovery operation including an active scanning process. In the active scanning, an STA performing scanning transmits a probe request frame to discover which APs exist therearound while moving channels, and waits for a response to the probe request frame. A responder transmits, as a response to the probe request frame, a probe response frame to the STA that has transmitted the probe request frame. Here, the responder may be the STA that last transmitted a beacon frame in the BSS of the channel being scanned. In the BSS, since the AP transmits a beacon frame, the AP becomes the responder. In the IBSS, the STAs in the IBSS alternately transmit the beacon frame, so the responder is not constant. For example, an STA that transmits a probe request frame on channel 1 and receives a probe response frame on channel 1 may store BSS-related information included in the received probe response frame and channel, and may move to the next channel (e.g., channel 2) and perform scanning (i.e., transmit/receive probe request/response on channel 2) in the same manner.

Although not illustrated in the example of FIG. 3, the scanning operation may be performed in a passive scanning manner. The STA performing the scanning based on the passive scanning may wait for a beacon frame while moving channels. The beacon frame is one of the management frames in IEEE 802.11, and is periodically transmitted to notify the existence of a wireless network, and is periodically transmitted so that the STA performing the scanning may find the wireless network and participate in the wireless network. In the BSS, the AP plays a role of periodically transmitting a beacon frame, and in the IBSS, the STAs in the IBSS rotate and transmit the beacon frame. When the STA performing the scanning receives the beacon frame, it stores information on the BSS included in the beacon frame and records the beacon frame information in each channel while moving to another channel. The STA receiving the beacon frame may store BSS-related information included in the received beacon frame, move to the next channel, and perform scanning on the next channel in the same manner.

The STA discovering the network may perform an authentication process through step S320. This authentication process may be referred to as a first authentication process in order to clearly distinguish the first authentication process from the security setup operation of step S340 to be described later. The authentication process of S320 may include a process in which the STA transmits an authentication request frame to the AP, and in response thereto, the AP transmits an authentication response frame to the STA. An authentication frame used for an authentication request/response corresponds to a management frame.

The authentication frame may include an authentication algorithm number, an authentication transaction sequence number, a status code, a challenge text, a robust security network (RSN), and a finite cyclic group, etc.

The STA may transmit an authentication request frame to the AP. The AP may determine whether to allow authentication for the corresponding STA based on information included in the received authentication request frame. The AP may provide the result of the authentication process to the STA through the authentication response frame.

The successfully authenticated STA may perform a connection process based on step S330. The connection process includes a process in which the STA transmits an association request frame to the AP, and in response, the AP transmits an association response frame to the STA. For example, the association request frame includes information related to various capabilities, and information related to a beacon listening interval, a service set identifier (SSID), supported rates, supported channels, RSN, mobility domain, supported operating classes, a traffic indication map (TIM) broadcast request, interworking service capability, and the like. For example, the association response frame may include information related to various capabilities, and information related to a status code, an association ID (AID), a support rate, an enhanced distributed channel access (EDCA) parameter set, a received channel power indicator (RCPI), a received signal to noise indicator (RSNI), a mobility domain, a timeout interval (association comeback time), an overlapping BSS scan parameter, a TIM broadcast response, a QoS map, and the like.

Thereafter, in step S340, the STA may perform a security setup process. The security setup process in step S340 may include, for example, a process of private key setup through 4-way handshaking through an extensible authentication protocol over LAN (EAPOL) frame.

1. Zigbee and Connected Home over IP (CHIP)

<Necessity of Zigbee>

There are currently standards for data such as voice, PC LANs, and video, but no wireless network standards to meet special needs of sensors or control devices. The sensors and control devices do not require a high frequency bandwidth, but require low latency and low energy consumption for long-term battery life and a wide array of devices.

Today, various wireless communication systems that do not require high data rates and operate with low cost and low power consumption are being produced.

Products produced in this way are manufactured without standards, and in the end, these past products cause compatibility problems with each product, and also problems with compatibility with new technologies.

<Introduction of Zigbee>

ZigBee is a high-level communication protocol that uses a small, low-power digital radio based on IEEE 802.15.4-2003. IEEE 802.15.4-2003 is a standard for short-range personal wireless communication networks such as lamps, electronic meters, and consumer electronic products using short-range radio frequencies. ZigBee is mainly used in radio frequency (RF) applications that require low data rates, low battery consumption, and network safety.

<Zigbee Features>

1) Low power consumption, simple implementation
2) Used for several months or years on one battery charge
3) Having active mode (receive, transmit), sleep mode.
4) Device, installation, maintenance, etc. are all possible at a relatively low cost
5) Safety (Security)
6) Reliability
7) Flexibility
8) Very small protocol stack
9) Interoperable and used anywhere
10) High node density per network (ZigBee's use of IEEE 802.15.4 makes it possible to handle many devices in the network. This feature enables control of a vast array of sensors and networks)
11) Simple protocol, internationally implemented (ZigBee protocol stack code size is only about a quarter of that of Bluetooth or 802.11)

<Use Field of Zigbee>

Zigbee is currently used in industrial control, embedded sensors, medical data collection, fire and theft, building automation, and home automation.

1) Smart Energy

Smart energy provides utility/energy service providers with a secure and easy-to-use home wireless network to manage energy. The smart energy enables utility/energy service providers or their customers to directly control thermostats or other associated devices.

2) Home Entertainment and Control

A smart power supply, an advanced temperature control system, safety and security, movies, and music 3) Home Recognition System A water temperature sensor, a power sensor, energy monitoring, fire and theft monitoring, smart devices, and connection sensors 4) Mobile Service Mobile payment, mobile monitoring and control, mobile security and access control, mobile healthcare, and remote support 5) Commercial Building Energy monitoring, air conditioning equipment, lighting, and access control 6) Industrial Plant Process control, material management, environmental management, energy management, industrial device control, and M2M communication <Zigbee Device Type>

Figure 4:
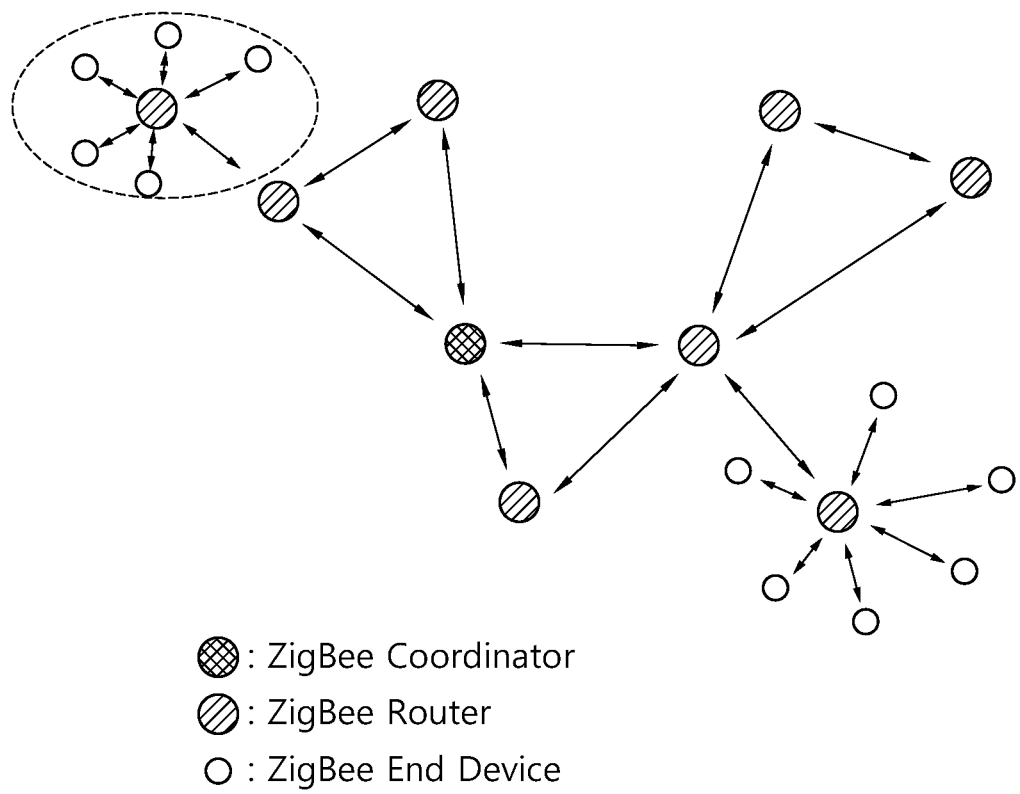
FIG. 4 is a diagram illustrating a Zigbee device type.

FIG. 4 is a diagram illustrating a Zigbee device type.

There are three types of Zigbee devices as illustrated in FIG. 4.

1) Zigbee Coordinator

The Zigbee coordinator forms a network with the most important device and connects the network with other networks. Each network has only one coordinator. The Zigbee coordinator may store information on the network and also serves as a trust center or storage for security keys.

2) Zigbee Router

A router may not only function as an application, but also function as a writer that may transmit data from other devices.

3) Zigbee End Device

The ZigBee end device includes the ability to communicate with the parent node. This relationship may allow a node to wait a long time, which may further extend the battery life.

<Zigbee Features>

Figure 5:
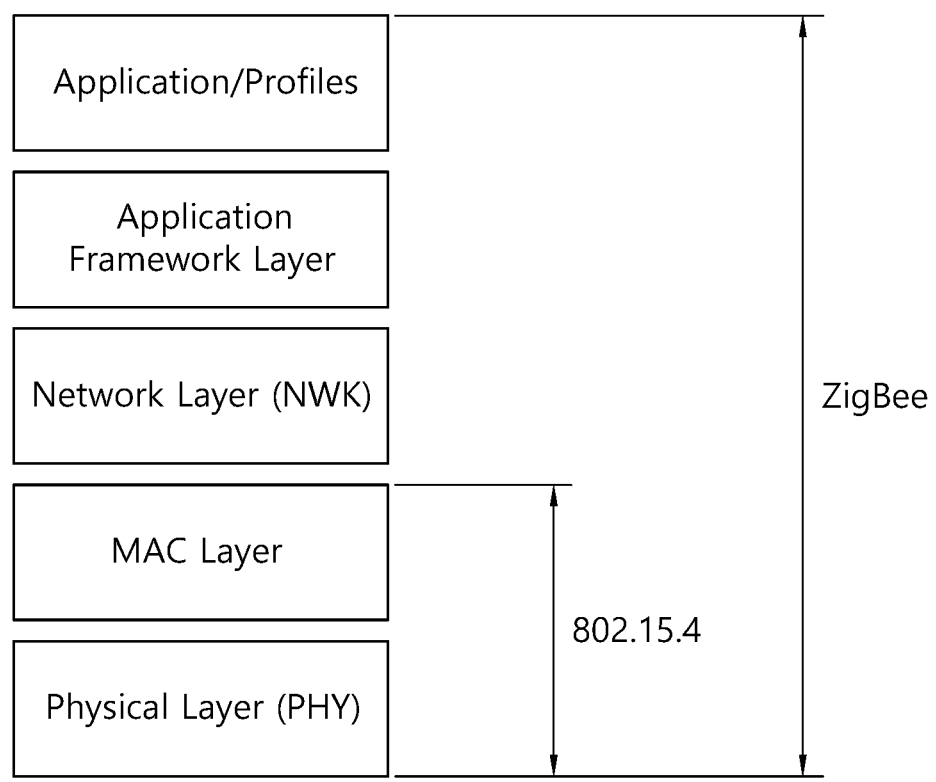
FIG. 5 is a diagram illustrating a Zigbee stack.

FIG. 5 illustrates a Zigbee stack.

The Zigbee stack is simpler than many other protocol stacks, and the size of the Zigbee stack code is small compared to other protocols. The MAC and PHY are defined by the IEEE 802.15.4 standard. The network and application layers are defined by the Zigbee Alliance and the actual application provided by the device designer.

802.15.4 is a simple packet data protocol for lightweight wireless networks. 802.15.4 is intended to monitor and control applications where battery life is critical. 802.15.4 is a source of ZigBee's excellent battery life.

802.15.4 is applicable to both IEEE long/short addressing. Short addressing is used for network management where a network ID is temporarily determined. This makes it less costly, but still allows use of over 65,000 network nodes.

In addition, 802.15.4 enables reliable data transmission and beacon management.

The network layer ensures proper operation of the MAC layer and provides an interface to the application layer. The network layer supports star, tree, and mesh topologies. The network layer is where networks are initiated, joined, destroyed, and discovered.

The network layer is responsible for routing and security.

The application framework is an execution environment in which application objects may exchange data. The application object is defined by the producer of the Zigbee device. As defined by Zigbee, the application object is located at the top of the application layer and is determined by the device manufacturer. The application object actually builds the application. This could be a light bulb, a light switch, an LED, an I/O line, and so on.

Looking at home appliances that are released these days, a modifier 'smart' is almost inevitably attached to the home appliances. It is difficult to find products that do not apply 'smart', such as smart TVs, smart refrigerators, smart air conditioners, and smart washing machines. These smart products are equipped with wired and wireless networks, communicate closely with each other, and implement various convenient functions based on Internet of Things (IoT) technology. When including various sensors with IoT technology, such as temperature and humidity sensors, door sensors, motion sensors, and IP cameras, it is possible to use more precise and diverse automation functions.

When a number of these smart products are gathered and applied to a single house, a 'smart home' is created. If users live in such a house, they may use various automation or remote functions, such as automatically turning on lights or air conditioners when users come home from work outside, and automatically playing appropriate music depending on the weather that day. Other similar concepts include "smart building", "smart factory", and the like.

However, there are side effects caused by the proliferation of smart products and products of various specifications. It is just a compatibility issue. In the IoT technology, communication and links between devices is the key, but since each device uses a different IoT platform, when they do not interwork with each other, the usability is greatly reduced.

For example, when the speaker is a product based on one platform, but the TV is only compatible with another platform, users may not be able to use the function to turn on the TV or switch channels through voice commands. Of course, recently, a single product may simultaneously support two or more IoT platforms. Or, there is a way to decorate a smart environment by purchasing all products based on the same platform. Even so, it is inconvenient to have to closely examine compatibility every time users purchase a product.

However, users probably do not need to worry about this in the future. This is because major IoT-related companies have gathered and announced a standard specification that allows all devices to be compatible without being platform dependent. Last May, the connectivity standards alliance (CSA) standards association introduced an IoT standard protocol called "Matter". The Matter standard known as project connected home over IP (CHIP) in the past has been supported by major players in the smart home market.

There are dozens of companies participating in the Matter standard enactment or announcing cooperation. These companies are global companies with a high market share in the IoT market. When the matter standards become widespread, all smart devices will now work seamlessly, regardless of manufacturer or platform.

The Matter is an IP-based protocol that may run on existing network technologies such as Wi-Fi, Ethernet, and thread. The federation of said Matter devices could be easily set up using Bluetooth low energy (BLE). Because the smart home devices may inform each other of their identity and possible operations, users do not need to do complicated configuration.

In particular, Matter's feature called 'multi-admin' allows products from various ecosystems, to work together without the complicated work of end users. Multi-admin may also set up layers of control to help different family members connect to smart appliances in the home with different levels of control.

Figure 6:
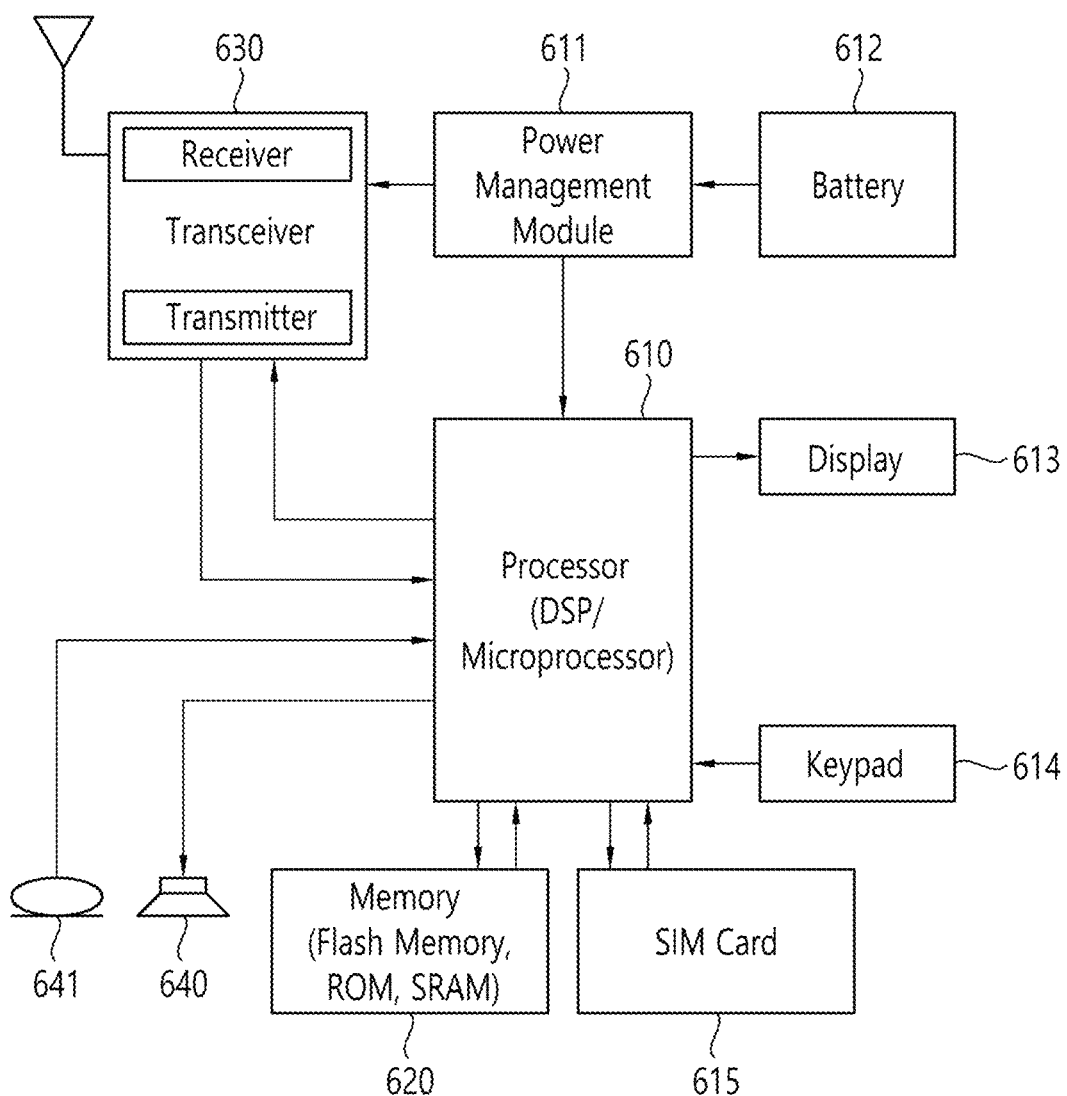
FIG. 6 is a diagram illustrating a modified example of a transmitting apparatus and/or a receiving apparatus of the present disclosure.

FIG. 6 illustrates a modified example of a transmitting device and/or receiving device of the present specification.

Each device/STA of the sub-figure (a)/(b) of FIG. 1 may be modified as shown in FIG. 6. A transceiver 630 of FIG. 6 may be identical to the transceivers 113 and 123 of FIG. 1. The transceiver 630 of FIG. 6 may include a receiver and a transmitter.

A processor 610 of FIG. 6 may be identical to the processors 111 and 121 of FIG. 1. Alternatively, the processor 610 of FIG. 6 may be identical to the processing chips 114 and 124 of FIG. 1.

A memory 620 of FIG. 6 may be identical to the memories 112 and 122 of FIG. 1. Alternatively, the memory 620 of FIG. 6 may be a separate external memory different from the memories 112 and 122 of FIG. 1.

Referring to FIG. 6, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 6, a speaker 640 may output a result related to a sound processed by the processor 610. A microphone 641 may receive an input related to a sound to be used by the processor 610.

2. Examples Applicable to the Present Disclosure

The present disclosure provides a method of acquiring device information when the controller connects the controlee in a smart home environment where the IoT controller controls and monitors IoT devices. In particular, before connecting a new Wi-Fi device to an access point (IP), it deals with how to check a manufacturer, a model name, version information, and supported functions of the device. The present disclosure provides a method of a controller to request device information and receive a response using a generic advertisement service (GAS) defined in 802.11u, and in particular, includes a method of encrypting/decrypting device information content for security and privacy of device information.

Many methods of connecting a controlee supporting Wi-Fi to an access point (AP) in an IoT environment are being used. In general, there are many difficulties in searching for and selecting a Wi-Fi access point from a controlee (light bulb, sensor, home appliance, etc.) with insufficient user interface and entering a password of the access point. In general, the related art uses a method in which an IoT/smart home device equipped with Wi-Fi performs an operation of a soft AP and a device having a user interface, such as a smartphone, is associated with the soft-AP and transmits the selection and password of home AP to which the smartphone is connected to the IoT device. In this case, in order to select the soft AP, a user finds and selects a name (SSID) of the AP specified in a user manual, etc., and thus, it is difficult to obtain additional information on the device.

Figure 7:
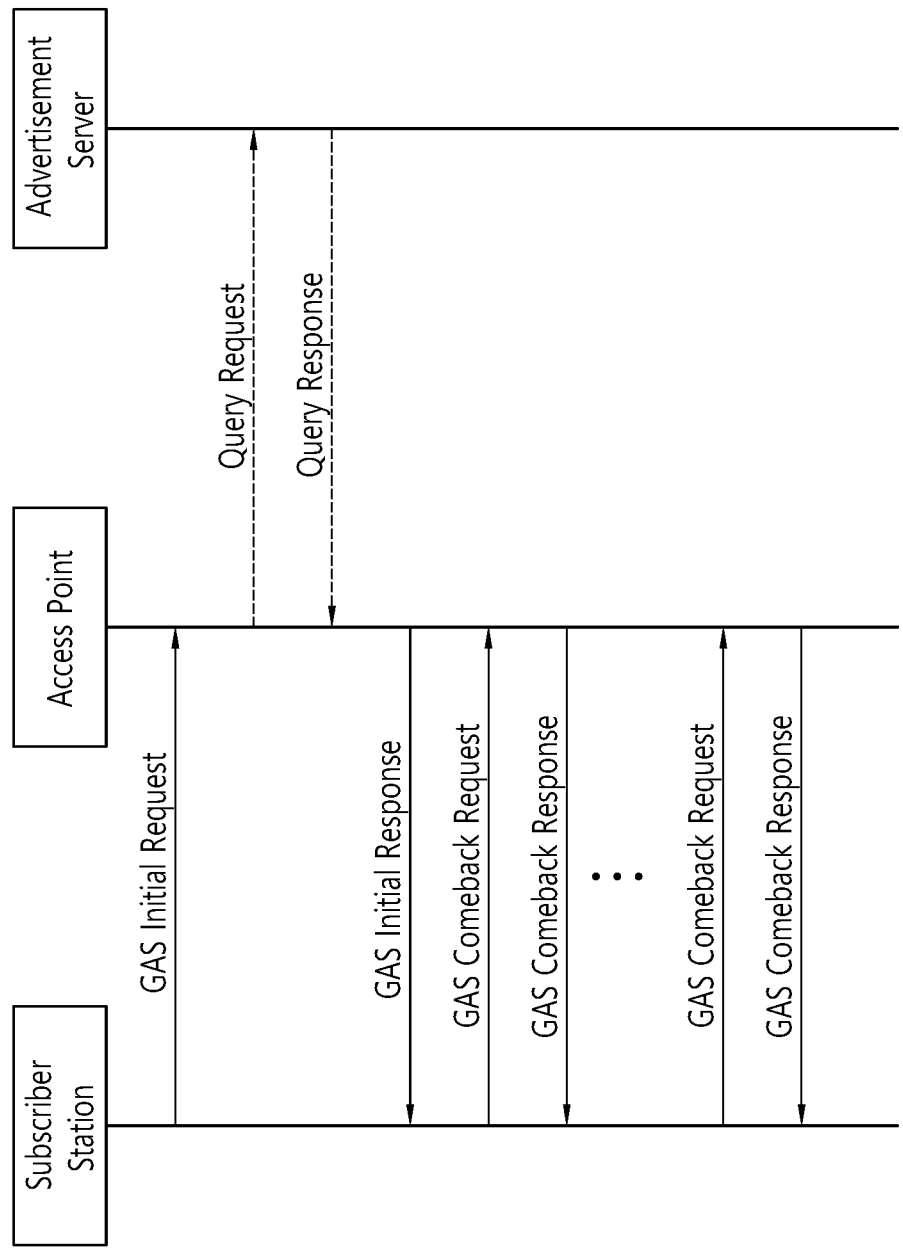
FIG. 7 is a diagram illustrating an example of a GAS Protocol operation.

FIG. 7 is a diagram illustrating an example of a GAS Protocol operation.

FIG. 7 illustrates an operation of the conventional generic advertisement service (GAS). A subscriber station is generally a device that wants to search for information, such as a smartphone, and an access point is a general access point. The advertisement service is a service that provides information, and may be physically included in the access point as a service or implemented as a separate service device (advertisement server). The subscriber station makes a GAS initial request to the access point for information retrieval. In this case, the station may be in a state associated with the access point or may be in a state before the association. This GAS initial request is transmitted to the advertisement server as a query request, and the advertisement server responds to this with a query response. The access point responds to a subscriber station with a GAS initial response to the response received from the advertisement server. The subscriber station may transmit and receive GAS comeback request and GAS comeback response for further interaction with the access point.

The present disclosure proposes a method of solving a difficulty of a process in which a user searches for and selects an access point in the prior art described above, and checking additional information on the device in advance before being associated with the AP after selection. In addition, the present disclosure provides an encryption method between a device and a smartphone to protect security and privacy of information.

2.1. Detailed Configuration

2.1.1. Connected Home Over IP (CHIP) Standard Technology

Figure 8:
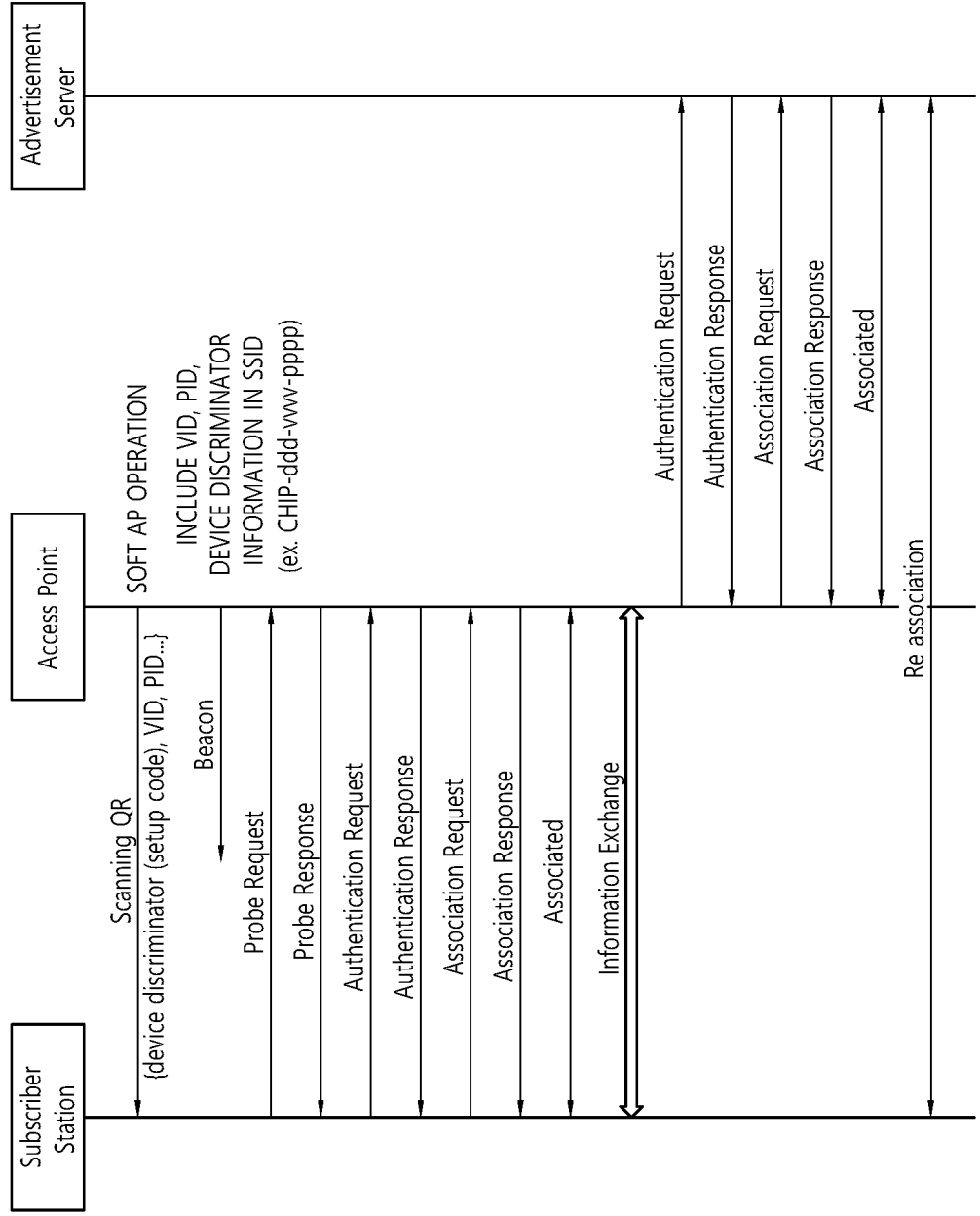
FIG. 8 is a diagram illustrating a method of acquiring device information according to a CHIP standard.

FIG. 8 is a diagram illustrating a method of acquiring device information according to a CHIP standard.

A method of connecting a CHIP device (accessory) to an access point in the CHIP standard is as illustrated in FIG. 8. In FIG. 8, a commissioner is a device such as a smart phone and serves as a CHIP controller. A CHIP device is a CHIP device equipped with Wi-Fi. The CHIP commissioner scans a quick response (QR) attached to the CHIP device to acquire information such as a vendor ID (VID), a product ID (PID), and a device discriminator (8-digit PIN code) of the device. When the CHIP device operates as a soft AP for initial setting, the CHIP device generates the soft AP by including the corresponding information in its service set identifier (SSID). In this case, the name of the SSID is prefixed with "CHIP-", and then, the VID, PID, device discriminator, and the like are included in the SSID. This information may be acquired by anyone who receives a beacon in the vicinity or transmits probe request to the corresponding soft AP.

2.1.2. Method of Acquiring Information of CHIP Device Using GAS

Figure 9:
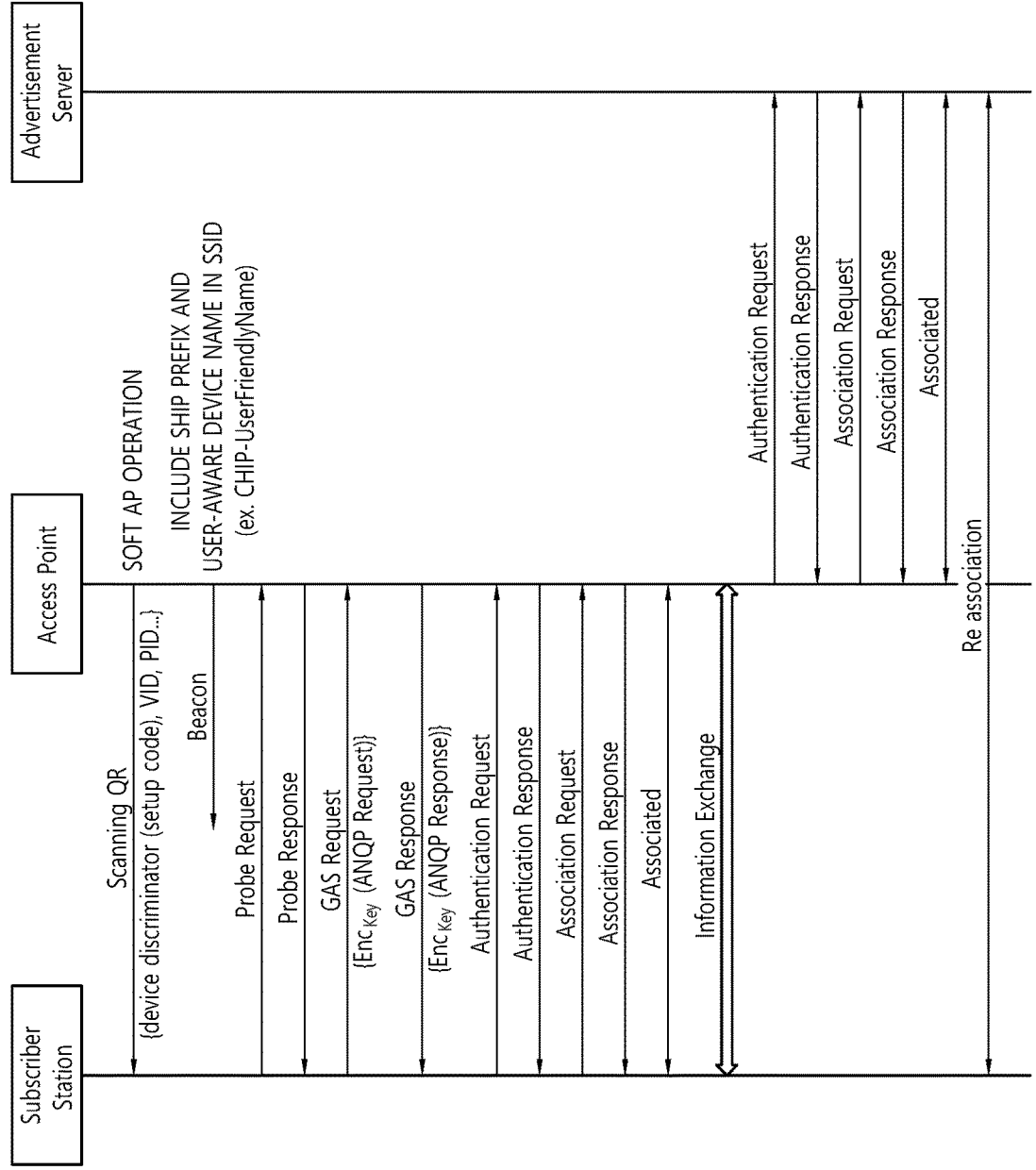
FIG. 9 is a diagram illustrating an example of device information exchange using GAS initial request/response.

FIG. 9 is a diagram illustrating an example of device information exchange using a GAS initial request/response.

FIG. 9 illustrates an information transmission method using GAS between a CHIP commissioner and a CHIP device. Unlike the CHIP standard described in section 2.1.1, when the CHIP device operates as the soft AP, the SSID does not include the information on the VID, PID, and device discriminator. The VID, PID, and device discriminator serve to check that the device that scanned the QR and the device searched through the Wi-Fi channel are the same device, and the value of the device discriminator is used to generate a secure session between CHIP devices in the future. The existing method in which a value such as a PIN used to generate the secure session is shared with an unspecified number of people has a security problem. The present disclosure provides a method of receiving an information request and response through a GAS initial request and a GAS initial response requesting device information, and encrypting/decrypting a payload of the information request and response through the device discriminator. The generation of the encryption key and the encryption/decryption process will be described later.

1) QR Code Scan

Similar to the existing standard, the commissioner scans the QR of the device to acquire the values of the VID, PID, and device discriminator. The purpose of the process is to acquire information through locality check and QR that the commissioner user confirms that the device is within a distance to scan the QR.

2) Soft AP

The CHIP device operates as a soft AP according to the CHIP standard. In this case, the beacon and probe response are not included, and the created soft-AP SSID is a CHIP device and consists of a user friendly name that may recognize the type of device. Examples of SSIDs are as follows.

e.g.) CHIP-Light, CHIP-LG-AirConditioner

In this case, the user recognizes that it is a CHIP device through the prefix called CHIP, and checks a device name that he/she wants to set through the user friendly name.

3) Beacon, Probe Request, Probe Response

Beacon, probe request, and probe response used in the process follow the 802.11 standard, and additional information (vendor specific IE) is not included in the CHIP standard.

However, in the case of vendor specific information element (IE) that the manufacturer adds separately from the standard, it may be added.

4) GAS Initial Request

When the commissioner searches for the soft AP created by the CHIP device, it can request additional information through the GAS initial request. When requesting the device information through the GAS initial request, the values that are basically included are as follows.

i. VID—Include the VID value obtained by QR on request ii. PID—Include the PID value acquired by QR on request iii. Payload—As a request query message, the message is encrypted and delivered according to the algorithm described later.

iii-1. The key used for encryption/decryption is a key generated by the commissioner and the device, and the same key is generated using the same seed value.

5) GAS Initial Response

In response to the query request, the response message is returned through the following steps.

i. Check whether the VID in the requested GAS initial request is the same as the device's own VID ii. Check whether the PID in the requested GAS initial request is the same as the device's own PID iii. Decrypt payload iii-1. Check whether the VID in the payload is the same as the VID requested to plain text iii-2. Check whether the VID in the payload is the same as the PID requested to plain text iii-3. Analyze and process the query of the GAS initial request 6) Authentication Request/Response Check and select the authentication method used to be associated with the soft AP 7) Association Request/Response Perform association based on additional information obtained by the commissioner through the GAS initial request/response Access soft AP 8) Information Exchange Transmission of SSID, BSSID, and password of the access point for the device to be associated with the access point (commissioner->device)

9) Access of Device to AP

Access of device to the access point based on the received information

10) Re Association to Commissioner AP

Re association of commissioner to AP

11) IP Communication

Commissioner and device perform IP-communication through access point

In the above sequence, the operation of processing VID and PID when the device processes the GAS initial response will be described through the flowchart of FIG. 10.

Figure 10:
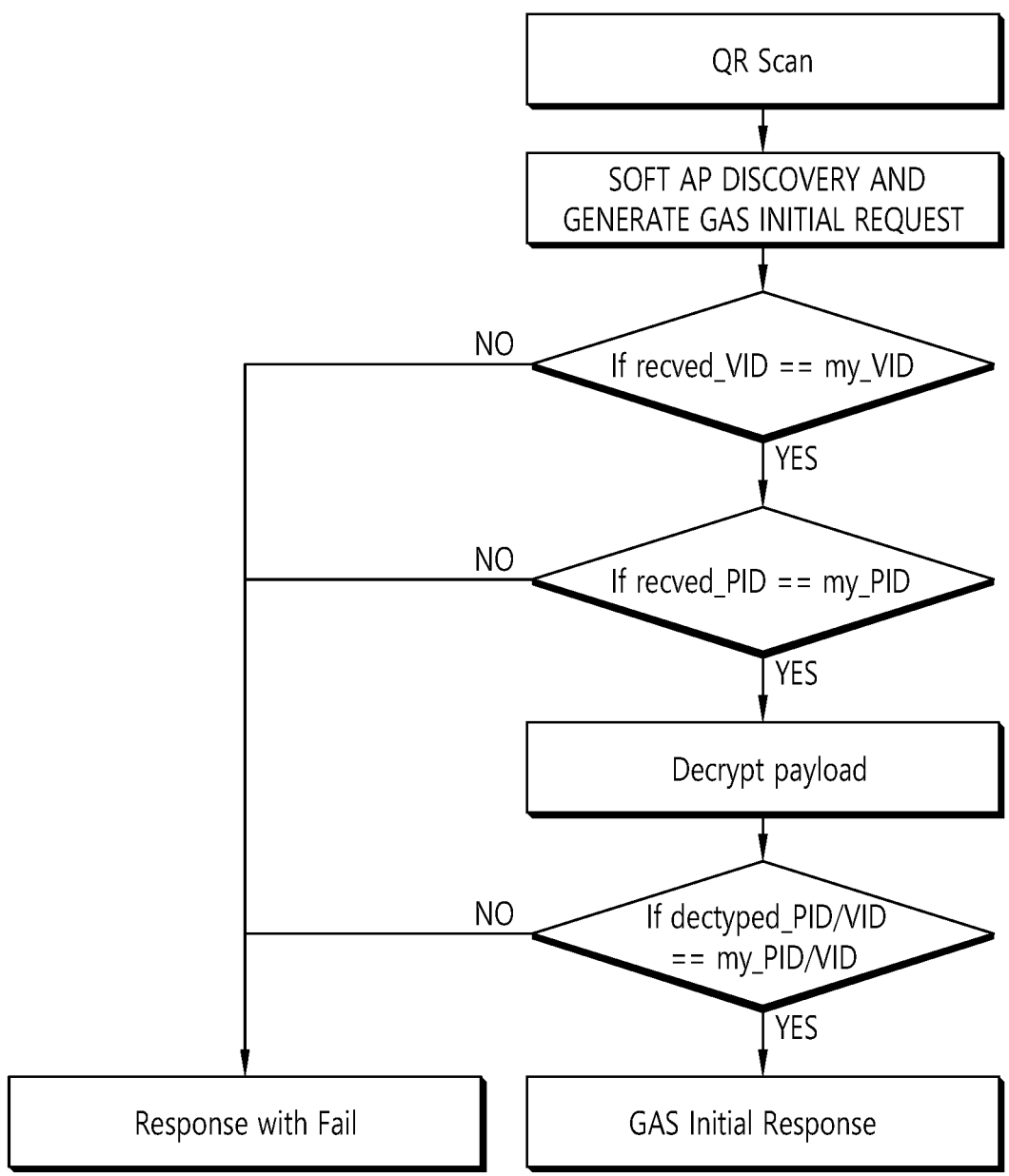
FIG. 10 is a diagram illustrating a process of transmitting device information.

FIG. 10 is a diagram illustrating a process of transmitting device information.

Referring to FIG. 10, the device compares the VID received through the GAS initial request with your own VID in "recved_VID==my_VID." When the VIDs are different, the device returns a GAS initial response with "invalid request" as a failure.

Referring to FIG. 10, the device compares the PID received through the GAS initial request with your own PID in "recved_PID==my_PID." When the PIDs are different, the device returns the GAS initial response with "invalid request" as a failure.

Referring to FIG. 10, the device decrypts the GAS initial request and reconfirms the decrypted VID and PID. In this case, the decrypted VID is also compared with the user's own VID. When the VIDs are different, the device returns a GAS initial response with "invalid request" as a failure. Alternatively, the decrypted PID compares with your own PID. When the PIDs are different, the device returns the GAS initial response with "invalid request" as a failure.

Examples of GAS Initial Request and GAS Initial Response

The present disclosure describes an embodiment of requesting/responding to additional information of the device within the GAS Initial Request and the GAS initial response. The payload in GAS basically defines only a container that may contain any information in the form of string. The information type and format included in the container is an embodiment, and the actual contents of the corresponding container are expandable.

The following example shows an example of requesting and responding to GAS initial request and GAS initial response in the form of mDNS-SD.

2.1.3.1 ANQP Query Format

FIG. 11 is a diagram illustrating a form of an ANQP query.

2.1.3.2. ANQP Response Format

FIG. 12 is a diagram illustrating a form of the ANQP response format.

2.1.3.3. mDNS-SD Type of Query/Response Type

The following is an example of a form of requesting and responding to the device information through the GAS initial request and the GAS initial response in the form of mDNS-SD.

The device may perform the initial registration of the service as follows to perform the GAS initial response.
Instance Name: accessory-efgh
Service Type: _chipc._udp,
Subtypes: d12,d1234,v123
Port: 11111
TXT Record Keys: d=1234 vp=123-456
dns-sd-R accessory-efgh _chipc._udp,d12,d1234,v123. 11111 d=1234 vp=123-456
Payload of the ANQP query in the GAS initial request may be included as follows.
dns-sd-B _chipc._udp
The CHIP device may respond to the query for service search as follows.—Each is a space-separated form, and indicates timestamp, add/remove, flags, interface, domain, service type, and instance name, from the front.
10:54:59.503 A 2 6 local. _chipc._udp. accessory-efgh
CHIP commissioner may query the details of the service instance.
dns-sd-L accessory-efgh _chipc._udp
An example of device response when querying a specific service instance is as follows.
10:56:51.920 accessory-efgh._chipc._udp.local. can be reached at GS-HQ10-NA107TZ.local.:11111 (interface 6)
d=1234 vp=123-456
Information included in a specific service instance includes the following.
Host Name: GS-HQ10-NA107TZ.local
Port: 11111
TXT record key: d=1234 vp=123-456
When the CHIP commissioner obtains an IP address of a specific host, it may be included in the query payload as follows.
dns-sd-G v4 GS-HQ10-NA107TZ.local
The response may be as follows
0:57:52.721 Add 40000002 6 GS-HQ10-NA107TZ.local. 192.168.0.38 120

2.2. Payload Encryption

As described in the previous chapter, the commissioner and the device can encrypt/decrypt and transmit the query and the response for transmission and reception of the device's sensitive information. This is a method of preventing hacking or hijacking by obtaining information about devices before or during setup by an unspecified majority. To this end, the device and commissioner may generate an encryption/decryption common key according to the method to be described later, and may encrypt/decrypt the payload in the query/responses through the generated key.

2.2.1. Generation of Encryption Key

The common key generated to encrypt and decrypt the query/response is generated with the same key by the commissioner and the device through the same method. The security strength of the encryption key may be increased by generating the key from both sides without directly passing the key.

2.2.1.1. Key Generation with Information Scanned Through QR

Figure 13:
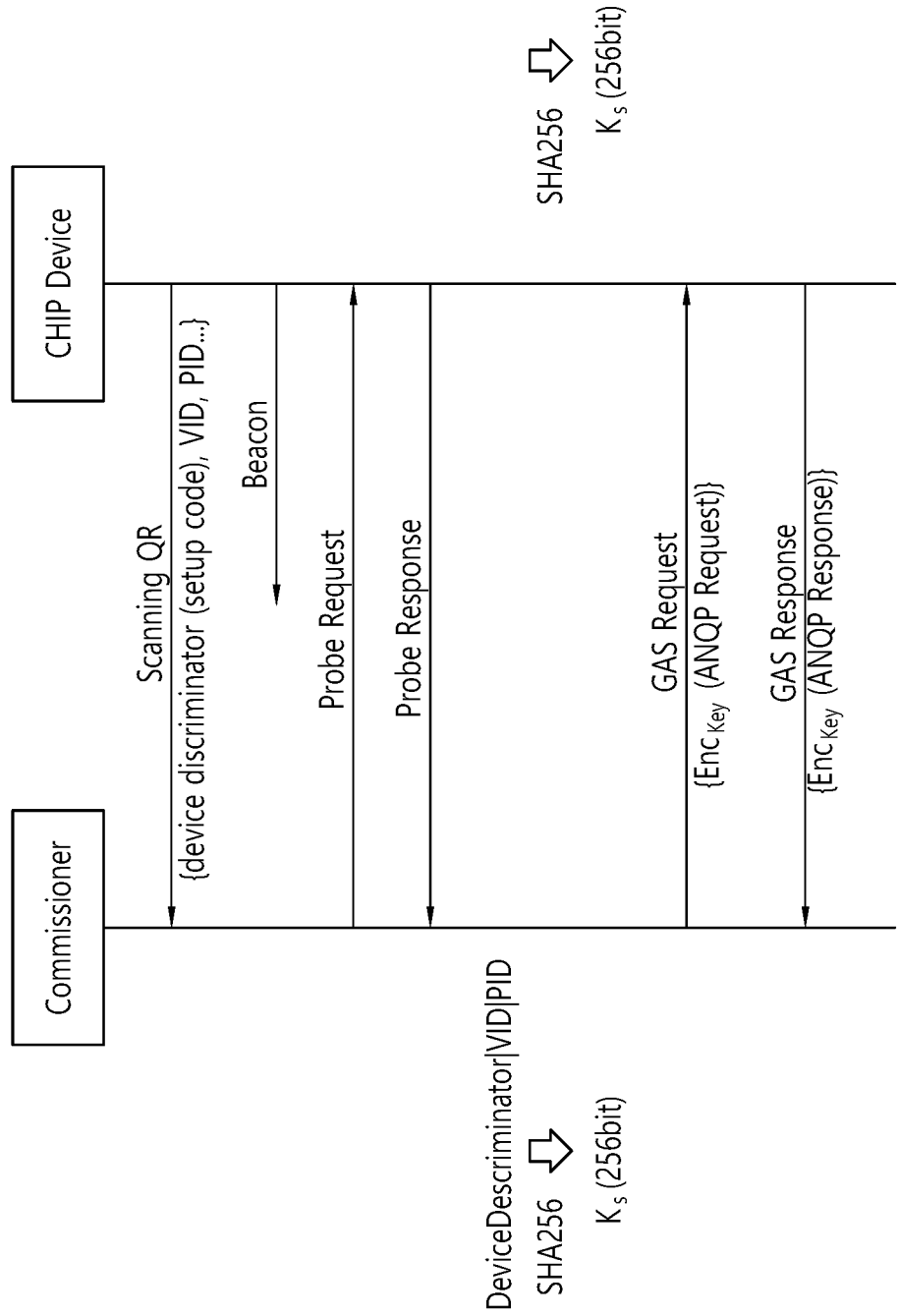
FIG. 13 is a diagram illustrating an example of generating a symmetric key between devices.

FIG. 13 is a diagram illustrating an example of generating a symmetric key between devices.

The key generation process below is described as the process of generating a shared key based on the information obtained through the initial QR Scan. In the present disclosure, it is not limited to the detailed algorithm used at this time, and it may be extended to other algorithms or the like.

As illustrated in FIG. 13, the commissioner and the device share basic information of the device discriminator, VID, and PID through the QR. The commissioner and device generate a secret key through key generation algorithm (e.g. SHA256) based on a concatenated value of this information. In this case, the two devices may generate a symmetric key without transmitting additional information through the Wi-Fi channel FIG. 14 is a diagram illustrating an example of generating an encryption key based on a value including a BSSID.

Figure 14:
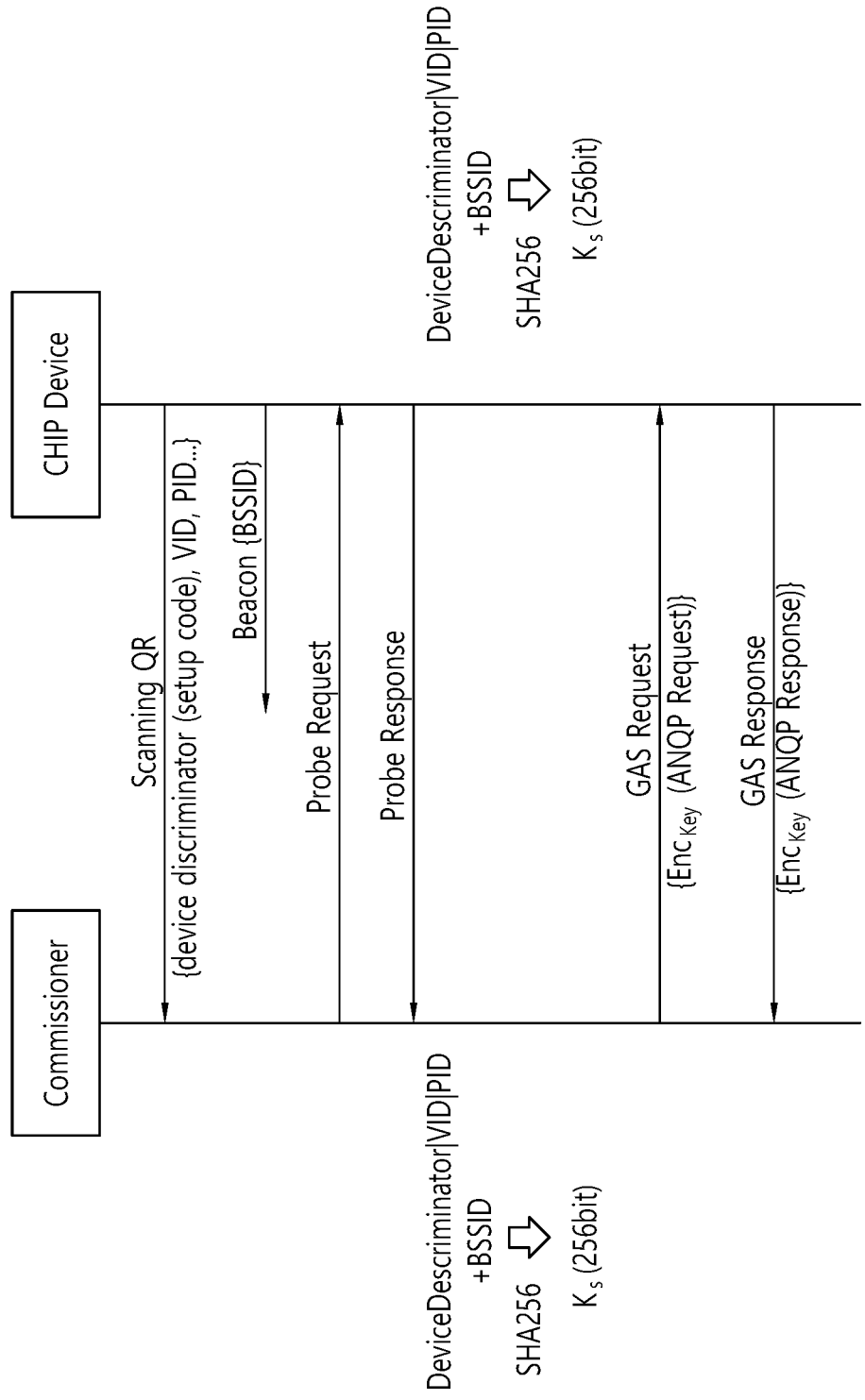
FIG. 14 is a diagram illustrating an example of generating an encryption key based on a value including a BSSID.

FIG. 14 shows a method of generating a key value including a soft-AP BSSID generated by the device when generating the key. When the device generates a different BSSID each time the soft-AP is generated, a higher level of security may be provided.

2.2.1.2. Key Generation Through Transmission of Information Through QR and Random Nonce FIG. 15 is a diagram illustrating an example of generating an encryption key based on the information through the QR, the BSSID, and the random nonce.

Figure 15:
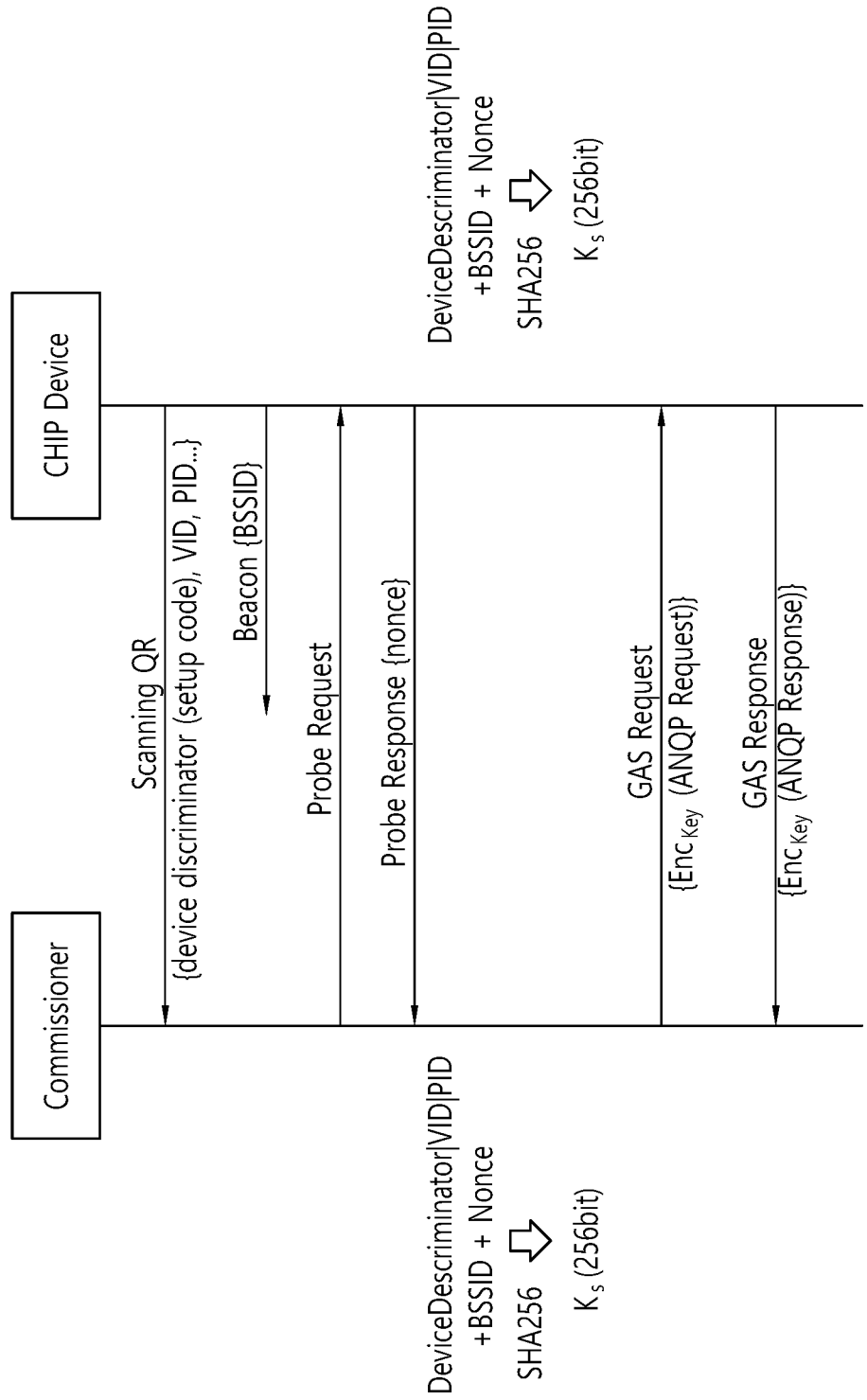
FIG. 15 is a diagram illustrating an example of generating an encryption key based on information through QR, BSSID, and random nonce.

The key generation process of FIG. 15 describes a process of generating a shared key based on information acquired through the initial QR Scan and a nonce value that is additionally transmitted. This embodiment is not limited to the detailed algorithm used at this time, and may be extended to other algorithms As illustrated in FIG. 15, in generating a key, a key value may be generated including information additionally transmitted through Wi-Fi. In an embodiment, the nonce value may be included in the probe request or the probe response, and the corresponding nonce value may be included in the key generation.

2.2.2. Use of Key

2.2.2.1 Encryption and Decryption

The generated key may be used to encrypt and decrypt the payload in the GAS request and response. When generating the GAS initial request, the commissioner may encrypt the request message by encrypting the payload through the generated key, and the device receiving the payload may decrypt the payload using the same key. The device may also encrypt the response through the same key value, and the commissioner receiving the response may decrypt the response.

2.2.2.2. Used as Password of Soft-AP

It may be used as a password/credential value used when being associated with the soft-AP based on the corresponding key value. When the device generates a soft-AP based on the corresponding key, a secure basic service set (BSS) may be generated, and the commissioner may be associated with the device's soft-AP only when the corresponding key is known to connect the device to the access point.

Hereinafter, the above-described embodiment will be described with reference to FIGS. 1 to 15.

Figure 16:
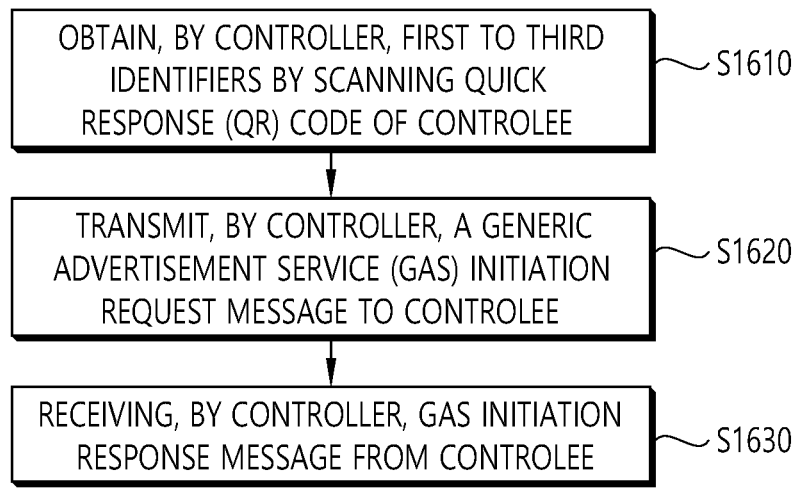
FIG. 16 is a flowchart illustrating a procedure of acquiring information of a CHIP device using GAS according to the present embodiment.

FIG. 16 is a flowchart illustrating a procedure of acquiring information of a CHIP device using GAS according to the present embodiment.

This embodiment provides a method in which an IoT device acquires information on a CHIP device using GAS and encrypts or decrypts the information before connecting or being associated with a CHIP device (controlee) to an AP in a smart home environment. A controller to be described below may correspond to a smart phone as the IoT controller, a controlee to be described later may correspond to a smart light bulb, a smart sensor, etc., as the IoT device, and an AP to be described later may correspond to a home AP to which the smartphone is connected.

In step S1610, the controller obtains first to third identifiers by scanning a quick response (QR) code of the controlee.

In step S1620, the controller transmits a generic advertisement service (GAS) initiation request message to the controlee.

In step S1630, the controller receives a GAS initiation response message from the controlee.

The GAS initiation request message includes the first and second identifiers and the encrypted payload. The GAS initiation response message includes a decrypted payload when the first and second identifiers are the same as identifiers of the controlee. The GAS initiation response message may include a request failure message when the first and second identifiers are not the same as the identifiers of the controlee.

The controlee may operate as a soft access point (AP) based on a connected home over Internet protocol (CHIP) standard. The first to third identifiers may not be included in the service set identifier (SSID) of the soft AP (distinct from the CHIP standard that does not use GAS).

The first identifier may be a vendor identifier (VID), the second identifier may be a product identifier (PID), and the third identifier may be a device discriminator.

First, the controller may receive a beacon from the controlee. The controller may transmit a probe request message to the controlee. The controller may receive a probe response message from the controlee.

The beacon may include the BSSID of the soft AP, and the probe response frame may include a random nonce value.

The controller may generate a shared key based on the first to third identifiers, the BSSID of the soft AP, or the random nonce value. The encrypted payload may be encrypted based on the shared key. The decrypted payload may be decrypted based on the shared key. The encryption key may be a symmetric key generated by the controller and the controlee, respectively. The shared key may be used as a password or certificate used when the controller is associated with the soft AP.

The controller may transmit an authentication request message to the controlee. The controller may receive an authentication response message from the controlee. The controller may transmit an association request message to the controlee. The controller may receive an association response message from the controlee. The controller may be associated with the soft AP based on the authentication request message, the authentication response message, the association request message, and the association response message.

The controller may transmit the SSID, basic service set identifier (BSSID) and password of the AP to the controlee. The controlee may be associated with the AP based on the SSID, BSSID, and password of the AP.

The controller may perform re association to the AP (Re association). The controller may perform Internet protocol (IP) communication with the controlee through the AP.

In the past, there were many difficulties for the controlee to connect to the AP, such as the user having to search for and select the AP and enter the password of the AP. In the present embodiment, the controller is associated with the soft AP in which the controlee operates, obtains information on the controlee using the GAS, and transmits the information on the AP to the controlee before the controlee is associated with the AP, thereby more efficiently performing IP communication. In addition, by encrypting and decrypting the payload included in the GAS message, it is possible to strengthen the security of the corresponding information and protect the privacy.

3. Device Configuration

The technical features of the present disclosure described above may be applied to various devices and methods. For example, the technical features of the present disclosure described above may be performed/supported through the apparatus of FIGS. 1 and/or 6. For example, the technical features of the present disclosure described above may be applied only to a part of FIGS. 1 and/or 6. For example, the technical features of the present disclosure described above are implemented based on processing chips 114 and 124 of FIG. 1, implemented based on processors 111 and 121 and memories 112 and 122 of FIG. 1, or implemented based on processor 610 and a memory 620 of FIG. 6. For example, the device of the present disclosure is a device operating in a wireless LAN system of a smart home environment, and the device includes a memory and a processor operatively coupled to the memory, in which the processor acquires first to third identifiers by scanning a quick response code by a controlee to obtain first to third identifiers, transmit a generic advertisement service (GAS) initiation request message to the controlee, and receives a GAS initiation response message from the controlee.

The technical features of the present disclosure may be implemented based on a computer readable medium (CRM). For example, the CRM proposed by the present disclosure is at least one computer readable medium including instructions based on being executed by at least one processor.

The CRM may store instructions performing an operation of scanning a quick response (QR) code of a controlee (controlee) to obtain first to third identifiers; transmitting a generic advertisement service (GAS) initiation request message to the controlee; and receiving a GAS initiation response message from the controlee. The instructions stored in the CRM of the present disclosure may be executed by at least one processor. At least one processor related to CRM of the present disclosure may be the processors 111 and 121 or the processing chips 114 and 124 of FIG. 1, or the processor 610 of FIG. 6. Meanwhile, the CRM of the present disclosure may be the memories 112 and 122 of FIG.

1, the memory 620 of FIG. 6, a separate external memory/storage medium/disk, or the like.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method in a wireless LAN system in a smart home environment, the method comprising:
   obtaining, by a controller, first to third identifiers by scanning a quick response (QR) code of a controlee;
   transmitting, by the controller, a generic advertisement service (GAS) initiation request message to the controlee; and
   receiving, by the controller, a GAS initiation response message from the controlee, wherein the GAS initiation request message includes the first and second identifiers and an encrypted payload,
   wherein the GAS initiation response message includes a decrypted payload when the first and second identifiers are the same as identifiers of the controlee,
   wherein the controlee operates as a soft access point (AP) based on a connected home over Internet protocol (CHIP),
   wherein the first to third identifiers are not included in a service set identifier (SSID) of the soft AP,
   wherein the first identifier is a vendor identifier (VID),
   wherein the second identifier is a product identifier (PID), and
   wherein the third identifier is a device discriminator.

2. The method of claim 1, wherein the GAS initiation response message includes a request failure message when the first and second identifiers are not the same as the identifiers of the controlee.

3. The method of claim 1, further comprising:
transmitting, by the controller, an authentication request message to the controlee;
receiving, by the controller, an authentication response message from the controlee;
transmitting, by the controller, an association request message to the controlee;
receiving, by the controller, an association response message from the controlee,
wherein the controller is associated with the soft AP based on the authentication request message, the authentication response message, the association request message, and the association response message.

4. The method of claim 3, further comprising:
transmitting, by the controller, the SSID, a basic service set identifier (BSSID), and a password of the AP to the controlee, and the controlee is associated with the AP based on the SSID, BSSID, and password of the AP.

5. The method of claim 4, further comprising:
performing, by the controller, re-association with the AP; and
performing, by the controller, internet protocol (IP) communication with the controlee through the AP.

6. The method of claim 1, further comprising:
receiving, by the controller, a beacon from the controlee;
transmitting, by the controller, a probe request message to the controlee;
receiving, by the controller, a probe response message from the controlee,
wherein the beacon includes the BSSID of the soft AP, and
the probe response frame includes a random nonce value.

7. The method of claim 6, further comprising:
generating, by the controller, a shared key based on the first to third identifiers, the BSSID of the soft AP, or the random nonce value,
wherein the encrypted payload is encrypted based on the shared key,
the decrypted payload is decrypted based on the shared key, and
the encryption key is a symmetric key generated by the controller and the controlee, respectively.

8. The method of claim 7, wherein the shared key is used as a password or certificate used when the controller is associated with the soft AP.

9. A controller in a wireless LAN system in a smart home environment, comprising:
a memory;
a transceiver; and
a processor operatively coupled with the memory and the transceiver,
wherein the processor obtains first to third identifiers by scanning a quick response (QR) code of a controlee,
transmits a generic advertisement service (GAS) initiation request message to the controlee, and
receive a GAS initiation response message from the controlee,
wherein the GAS initiation request message includes the first and second identifiers and an encrypted payload, and
wherein the GAS initiation response message includes a decrypted payload when the first and second identifiers are the same as the identifiers of the controlee,
wherein the controlee operates as a soft access point (AP) based on a connected home over Internet protocol (CHIP),
wherein the first to third identifiers are not included in a service set identifier (SSID) of the soft AP,
wherein the first identifier is a vendor identifier (VID),
wherein the second identifier is a product identifier (PID), and
wherein the third identifier is a device discriminator.

10. The controller of claim 9, wherein the GAS initiation response message includes a request failure message when the first and second identifiers are not the same as the identifiers of the controlee.

11. The controller of claim 9, wherein the processor transmits an authentication request message to the controlee,
receive an authentication response message from the controlee,
transmits an association request message to the controlee, and
receives an authentication response message from the controlee, and
the controller may access the soft AP based on the authentication request message, the authentication response message, the association request message, and the association response message.

12. The controller of claim 11, wherein the processor transmits the SSID, a basic service set identifier (BSSID), and a password of the AP to the controlee, and the controlee is associated with the AP based on the SSID, BSSID, and password of the AP.

13. The controller of claim 12, wherein the processor performs re-association with the AP, and performs internal protocol (IP) communication with the controlee through the AP.

14. The controller of claim 9, wherein the processor receives a beacon from the controlee,
transmits a probe request message to the controlee, and
receives a probe response message from the controlee,
the beacon includes the BSSID of the soft AP, and
the probe response frame includes a random nonce value.

15. The controller of claim 14, wherein the processor generates a shared key based on the first to third identifiers, the BSSID of the soft AP, or the random nonce value,
the encrypted payload is encrypted based on the shared key,
the decrypted payload is decrypted based on the shared key, and
the encryption key is a symmetric key generated by the controller and the controlee, respectively.

16. The controller of claim 15, wherein the shared key is used as a password or certificate used when the controller is associated with the soft AP.

* * * * *